US007215759B2

(12) United States Patent
Brown et al.

(10) Patent No.: US 7,215,759 B2
(45) Date of Patent: May 8, 2007

(54) HOLD QUEUE WAIT ESTIMATIONS

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 10/015,266

(22) Filed: Dec. 12, 2001

(65) Prior Publication Data

US 2003/0108187 A1 Jun. 12, 2003

(51) Int. Cl.
*H04M 3/00* (2006.01)
(52) U.S. Cl. .......................... 379/266.06; 379/207.03; 379/265.01; 379/265.02; 379/265.09; 379/266.01; 379/266.03; 379/266.1
(58) Field of Classification Search ........... 379/207.03, 379/209.15, 265.01, 266.1, 266.03, 266.01, 379/265.09, 265.02, 266.036
See application file for complete search history.

(56) References Cited

U.S. PATENT DOCUMENTS

| 4,788,715 A | 11/1988 | Lee .............................. 379/84 |
| 5,014,298 A | 5/1991 | Katz ............................. 379/93 |
| 5,020,095 A | 5/1991 | Morganstein et al. ......... 379/67 |
| 5,166,974 A | 11/1992 | Morganstein et al. ......... 379/67 |

(Continued)

FOREIGN PATENT DOCUMENTS

EP  0585004 A2  3/1994

(Continued)

OTHER PUBLICATIONS

WPAT Derwent 1994-067503.

(Continued)

*Primary Examiner*—Ahmad F. Matar
*Assistant Examiner*—Quynh H. Nguyen
(74) *Attorney, Agent, or Firm*—Mark S. Walker; Amy J. Pattillo

(57) ABSTRACT

A method, system, and program for estimating hold queue wait times are provided. Call times are individually estimated for multiple calls within a call center. In particular, call times may be estimated according to representative profiles, caller profiles, and current caller activity of the multiple calls within the call center. The identity of each caller may be authenticated and a caller profile accessed from a central server according to authenticated caller identities. The central server may be accessible to multiple call centers, where each call centers accesses and updates caller profiles according to a single caller identifier for each caller. In addition, call times estimates and factors utilized to calculate call time estimates may be output to a caller, preferably according to an output interface specified by the caller in the caller profile.

40 Claims, 7 Drawing Sheets

U.S. PATENT DOCUMENTS

| | | | |
|---|---|---|---|
| 5,864,616 | 5,444,774 | 8/1995 | Friedes |
| ....... 379/266 | 5,499,288 | 3/1996 | Hunt et al. |
| ........ 379/88 | 5,506,898 | 4/1996 | Costantini et al. |
| ....... 379/266 | 5,561,707 | 10/1996 | Katz |
| ......... 379/88 | 5,673,404 | 9/1997 | Cousins et al. |
| ....... 395/347 | 5,790,637 | 8/1998 | Johnson et al. |
| ........ 379/67 | 5,796,791 | 8/1998 | Polcyn |
| ........ 379/265 | 5,802,526 | 9/1998 | Fawcett et al. |
| | A | 1/1999 | Hartmeier ................... 379/266 |
| 5,867,572 | A | 2/1999 | MacDonald et al. ........ 379/266 |
| 5,915,001 | A | 6/1999 | Uppaluru ................. 379/88.22 |
| 5,937,044 | A | 8/1999 | Kim ...................... 379/121.05 |
| 5,940,476 | A | 8/1999 | Morganstein et al. .... 379/88.02 |
| 5,946,386 | A | 8/1999 | Rogers et al. ......... 379/121.05 |
| 5,946,654 | A | 8/1999 | Newman et al. ............ 704/246 |
| 6,038,305 | A | 3/2000 | McAllister et al. ......... 379/207 |
| 6,058,364 | A | 5/2000 | Goldberg et al. ........... 704/252 |
| 6,064,730 | A | 5/2000 | Ginsberg .................... 379/265 |
| 6,088,435 | A * | 7/2000 | Barber et al. .......... 379/205.01 |
| 6,101,242 | A | 8/2000 | McAllister et al. ...... 379/88.02 |
| 6,122,357 | A | 9/2000 | Farris et al. ................. 379/207 |
| 6,141,328 | A | 10/2000 | Nabkel et al. .............. 370/259 |
| 6,178,230 | B1 | 1/2001 | Borland .................... 379/67.1 |
| 6,259,771 | B1 | 7/2001 | Kredo et al. ............. 379/88.17 |
| 6,381,329 | B1 | 4/2002 | Uppaluru et al. ...... 379/266.04 |
| 6,522,743 | B1 | 2/2003 | Hurd ..................... 379/266.04 |
| 6,539,080 | B1 | 3/2003 | Bruce et al. |
| 6,707,906 | B1 | 3/2004 | Ben-Chanoch ......... 379/266.07 |
| 6,826,173 | B1 | 11/2004 | Kung et al. ................. 370/352 |
| 6,826,276 | B2 | 11/2004 | Brown et al. .......... 379/265.02 |
| 6,842,767 | B1 | 1/2005 | Partovi et al. .............. 709/203 |
| 6,845,155 | B2 | 1/2005 | Elsey .................... 379/266.04 |
| 2002/0141561 | A1* | 10/2002 | Duncan et al. ......... 379/220.01 |
| 2004/0029567 | A1* | 2/2004 | Timmins et al. ......... 455/412.1 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

OTHER PUBLICATIONS

WPAT Derwent 1995-346415.
WPAT Derwent 1996-315499.
WPAT Derwent 1999-031530.

* cited by examiner

| HOLD QUEUE INFORMATION MENU TRANSCRIPT | 80 |

XYZ SERVICE

TO RECEIVE PUBLICATION OF HOLD QUEUE INFORMATION: PRESS OR ENTER 1

FOR VOICE OUTPUT TO CALLING DEVICE : PRESS OR ENTER 1
FOR TEXT OR GRAPHIC OUTPUT TO CALLING DEVICE : PRESS OR ENTER 2

CURRENT PEOPLE ON HOLD : 40
    AVERAGE TIME IN HOLD QUEUE TODAY : 70 MINS
    CONSULTANTS ON DUTY : 5
    CALL DURATION : 12 MINS
    YOUR POSITION : 25
    YOUR ESTIMATED WAIT TIME : 125 MINS
    TIME LEFT TO CLOSE OF BUSINESS : 240 MINS
    YOUR TRACKING NUMBER IS : 12930
    YOUR TOTAL TIME ON HOLD : 5 MINS
    ON-LINE WEB SITE : WWW.XYZSERVICE.COM
    PRESS 8 FOR MORE OPTIONS

FOR WEB ACCESS : PRESS OR ENTER 3

ON-LINE WEB SITE : WWW.XYZSERVICE.COM

FOR EMAIL : PRESS OR ENTER 4
FOR INSTANT MESSAGING : PRESS OR ENTER 5

TO LOG THE SUBJECT MATTER OF YOUR CALL : PRESS OR ENTER 2

SELECT FROM ONE OF THE FOLLOWING SUBJECTS
    PRINTER ISSUE : PRESS OR ENTER 1
    MODEM ISSUE : PRESS OR ENTER 2
    MOUSE ISSUE : PRESS OR ENTER 3
    MONITOR ISSUE : PRESS OR ENTER 4
    OTHER HARDWARE ISSUE : PRESS OR ENTER 5
    UNIDENTIFIED ISSUE : PRESS OR ENTER 6

FIG. 4

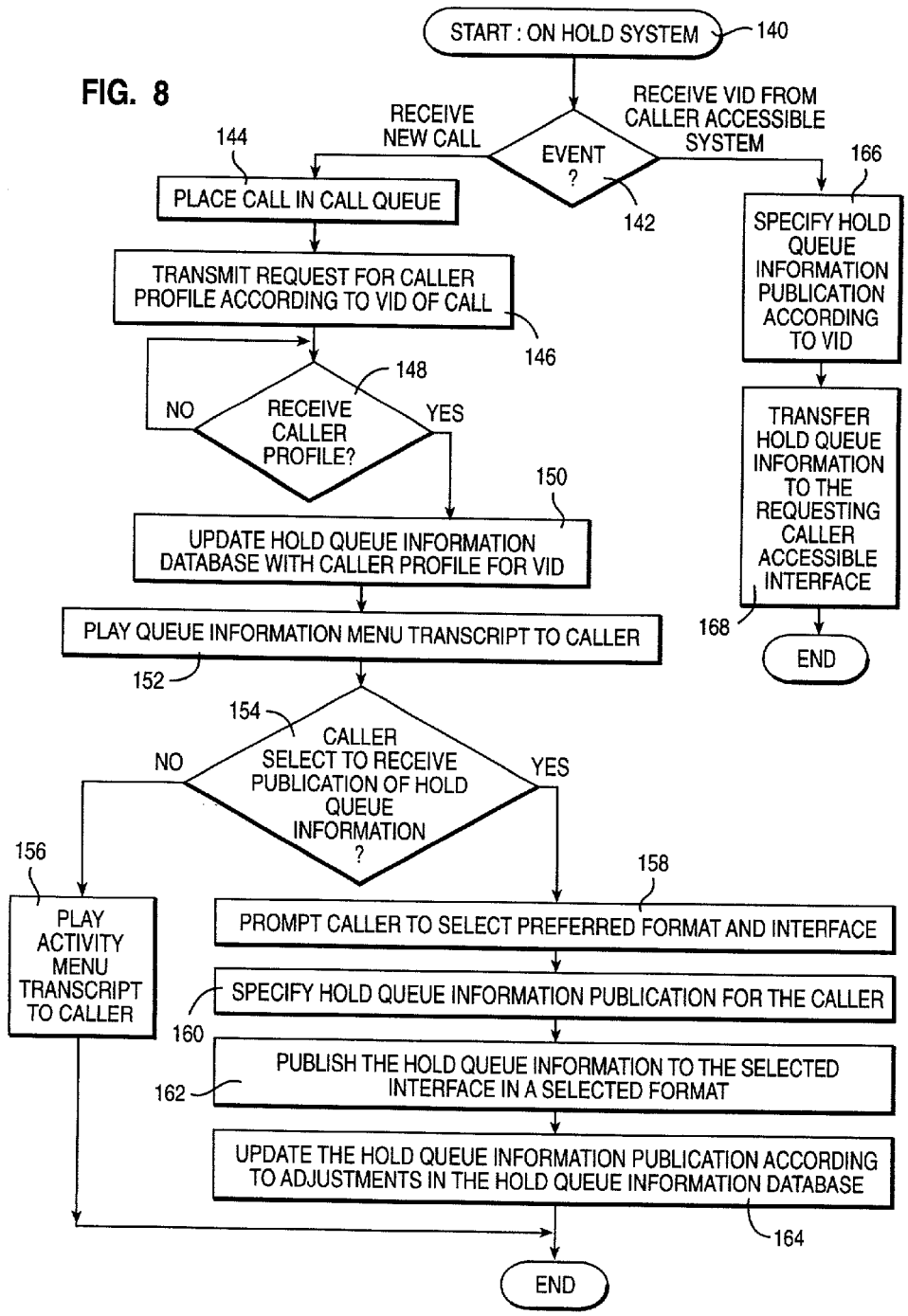

HOLD QUEUE WAIT ESTIMATIONS

CROSS-REFERENCE TO RELATED APPLICATIONS

The present application is related to the following copending applications:
(1) U.S. patent application Ser. No. 10/015,380;
(2) U.S. patent application Ser. No. 10/015,264;
(3) U.S. patent application Ser. No. 10/015,382;
(4) U.S. patent application Ser. No. 10/015,383; and
(5) U.S. patent application Ser. No. 10/005,680;

BACKGROUND OF THE INVENTION

1. Technical Field

The present invention relates in general to telecommunications and, in particular, to call hold queues. Still more particularly, the present invention relates to estimating hold queue wait times and displaying factors affecting hold queue wait times to callers.

2. Description of the Related Art

Many companies provide telephone-based access to help staff, sales personnel, representatives, and automated menus. Where high telephone call traffic is typical in telephone access to a company's representatives, a PBX system receives the call and distributes the call to an automatic call distributor (ACD). ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. One way to alleviate some of the frustration associated with call queues is by alerting callers to a current position within the call queue and an estimated hold time.

For example, a call queue system may inform callers waiting in a call hold queue of the average wait time for callers in the hold queue through a voice announcement. However, the average wait time for callers in a hold queue only indicates a generic time averaged across callers within a particular time period.

Therefore, in view of the foregoing, it would be advantageous to provide a method, system, and program for publishing call queue information to each caller that will aid each caller in understanding the relative position of each caller within a call queue. Further, it would be advantageous to provide a method, system, and program for providing an estimation of an expected wait time for each individual caller in a call queue.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for estimating hold queue wait times and displaying factors affecting hold queue wait times to callers.

According to one aspect of the present invention, call times are individually estimated for multiple calls within a call center. In particular, call times may be estimated according to representative profiles, caller profiles, and current caller activity of the multiple calls within the call center. Further, in particular, caller profiles may be accessed from a caller profile server that compiles time averages for multiple callers across multiple call centers. Caller profiles may be accessed according to authenticated caller identifiers received with each call.

A particular call received from a caller at the call center is positioned within a hold queue. A wait time in the hold queue for the particular call is estimated according to the call times individually estimated for the multiple callers within the call center. The wait time may then be published to the caller, distinguishing the call times utilized to estimate the wait time.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts an illustrative hold queue information menu transcript in accordance with the method, system, and program of the present invention;

FIG. 8 illustrates a high level logic flowchart of a process and program for controlling an on hold system in accordance with the method, system, and program of the present invention.

DETAILED DESCRIPTION OF THE PREFERRED EMBODIMENT

Figure 1:
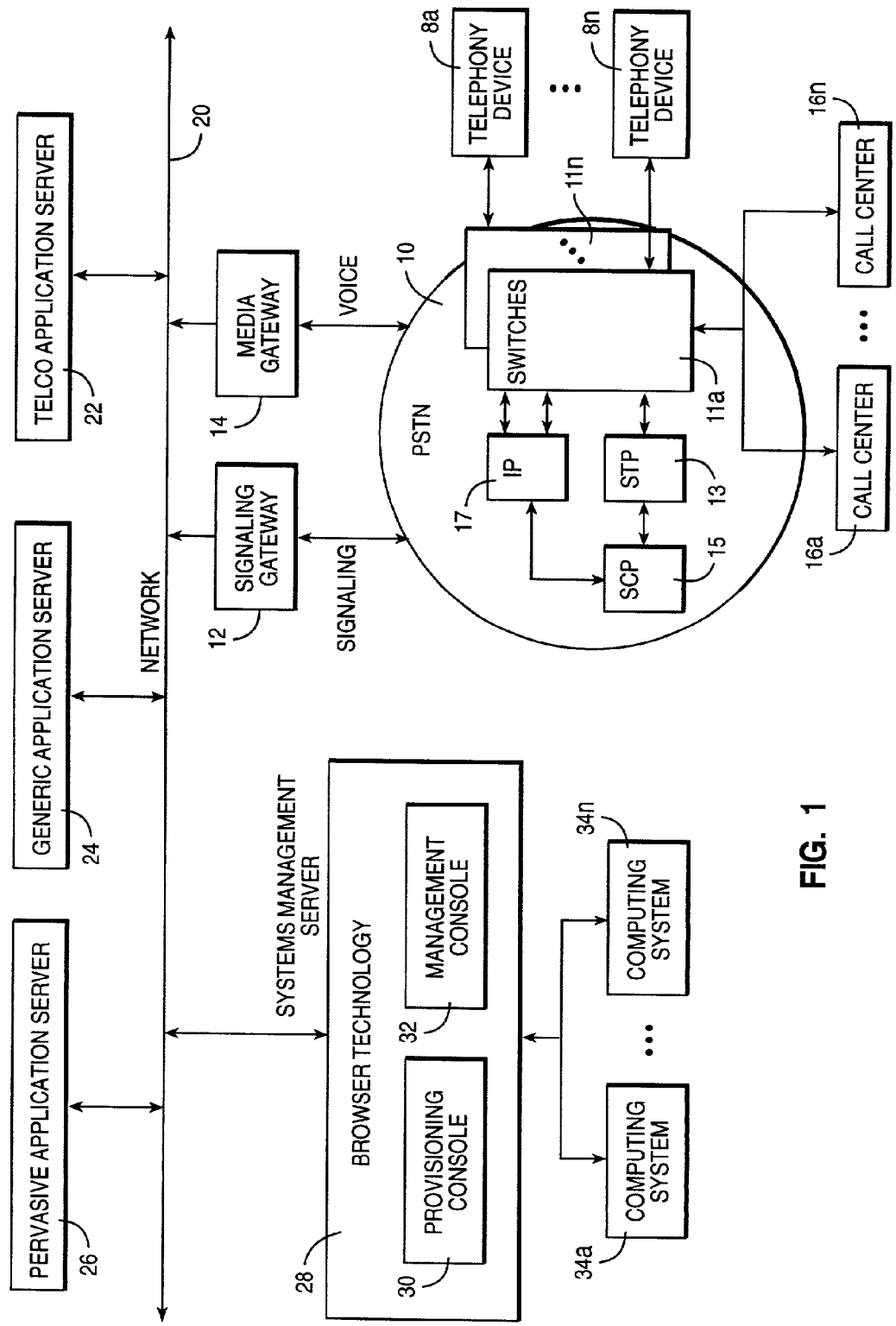
FIG. 1 illustrates a block diagram of a telecommunications network in which the present invention may be implemented.

A method, system, and program for publishing call hold queue information to a caller for enabling estimation of an individual caller's remaining wait time are provided. In particular, hold queue information may include real-time information about call hold times, current call duration times, current call queue positions, current number and identity of representatives available, and other information indicative of current call system activity. In addition, hold queue information may include estimations, such as estimated wait times, estimated time per call, estimated time per subject of call, and other time estimations calculated from current and past call system activity. Further, hold queue information may include historical information, such as average overall wait times, average call duration times, and other historical information reflective of past call system activity.

According to a particular advantage of the present invention, caller profiles may be stored according to a caller identifier (VID) at a central location. In particular, multiple call centers may update a caller profile according to call durations, time with representatives, subject of calls, and other information that is advantageously shared across call centers in order to provide a more accurate estimate of future call holding times.

For purposes of the present invention, call hold queue information may be published to a caller in multiple formats, such that the interface that is preferred by a caller is utilized to output the call hold queue information. Output formats may include, but are not limited to, voice output, text output, graphical output, video output, and other output formats that are available. Interfaces may include, but are not limited to, wired telephones, wireless telephones, personal computers, pervasive computing devices configured with appropriate telephony software and Internet connectivity, and network servers. The term "publication" preferably encompasses voice, text, graphical, video and other output forms of call hold queue information.

In addition, for purposes of the present invention, a caller may designate the intended subject matter of call. The intended subject matter may be selected by the caller from a menu of designated subjects. In addition, the intended subject matter may be provided by the caller in multiple formats including, but not limited to, voice, keypad, video, text, or other available formats.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information from one service provider to the next without security features.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other biometric methods. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

PSTN Identity Authentication and Call Control

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP initiates an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other biometric methods.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15. In addition, as previously described, caller authentication to determine VIDs and RVIDs may be performed by a third party, such as telco application server 22.

An origin telephony device or destination telephony device may also determine a VID and/or RVID for the caller and/or callee of a call. In particular, telephony devices 8a–8n and call centers 16a–16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, when a central office switch detects an off-hook condition on a line, the central office switch will then determine if a VID signal is transferred from the off-hook telephony device. If a VID is transferred, then a query is made to SCP 15 according to the VID for any services specified for the authenticated subscriber. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

Alternatively, if a VID signal is not transferred from the off-hook telephony device, then the central office switch will provide a dial tone and transfer the call to an IP that prompts the caller to provide a voice entry or other identification. Alternatively, the central office switch may transfer the call to telco application server 22 for use of the caller authentication service. In either case, the identity for the subscriber is preferably authenticated, the call is transferred back to the central office switch, services are provided according to the VID authenticated for the subscriber, and the call is routed according to dialed digits from the off-hook line terminal.

In addition, an RVID may be provided in the present invention to authenticate the identity of a callee receiving the call. When a call is answered, the call is transferred back to an IP or telco application server 22 to authenticate the identity of the callee answering the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

Call Center Environment

Figures 2, 5:
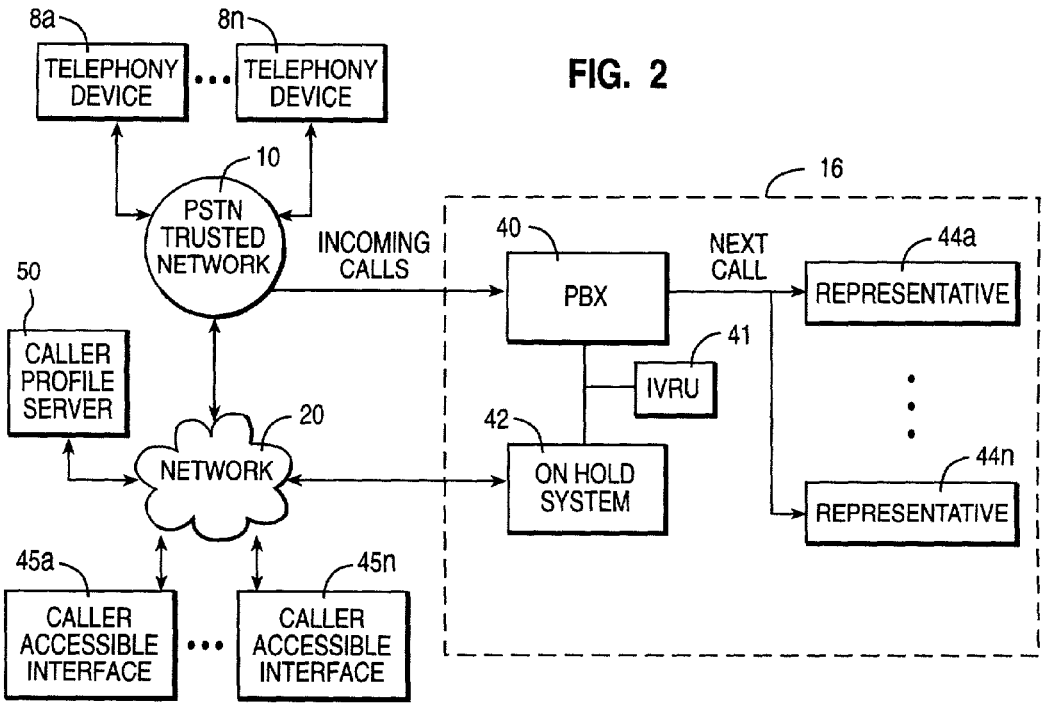
FIG. 2 depicts a block diagram of a network call or contact center system in which the present invention may be implemented.
FIG. 5 illustrates a graphical representation of a hold queue information publication in accordance with the method, system, and program of the present invention.

Referring now to FIG. 2, is an illustrative network call or contact center environment in which the present invention may be implemented. It will be appreciated by one with skill in the art that although a particular network environment is described below, the invention is not limited to use within the described network environment, rather, the inventive queue position advancement process may be implemented within any on-hold information service regardless of the telephony environment.

As illustrated, multiple incoming calls are received at a call center 16. In particular, a connection 38 includes a voice trunk and a signal link, such that both voice and VID signals may be received at PXB 40 from PSTN 10. Connection 38 is preferably connected to PSTN 10 via a wireline, wireless, Internet Protocol network, or other connection. PBX 40 distributes incoming calls to multiple representative terminals 44a–44n via connection 39, wherein connection 39 also includes a voice trunk and a signal link. In particular, PBX systems, and in particular PBX systems with automatic call distribution (ACD) ability, are well known in the art as switching systems designed to received telephone calls destined for call center 16 and to queue those call when a call handling agent is not available.

In the description which follows, it will be assumed that all representative terminals 44a–44n are busy and therefore PBX 40 cannot respond to an incoming call by making a direct connection to one of representative terminals 44a–44n. As a result, PBX 40 is forced to place the incoming call on hold. However, an advantage of the present invention is that when a call is transferred to one of representative terminals 44a–44n, the VID for the call is also transferred, enabling a representative to receive an authenticated identity of a caller. Additional authentication may be required by PBX 40 where callers are accessing sensitive information from representatives.

After placing the incoming call on hold, the VID, time of call, and other information received by PBX 40 are forwarded to on hold system 42. On hold system 42 preferably creates a record based on the call and positions the call within one of the call hold queues within on hold system 42. In particular, the call queue selected for a call may be specified by a caller indication of the subject matter of a call. In addition, a single call queue may be utilized to store all calls on hold.

While the call is on hold, an interactive voice response unit (IVRU) 41, coupled to PBX 40 and on hold system 42, may offer the caller a menu of available options for receiving call hold queue information for on hold system 42. In general, IVRU 41 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within on hold system 42. For purposes of the present invention, prompts to the caller may be in voice, text, video, and/or graphical formats depending on the interface receiving the prompt. In addition to or as an alternative to IVRU 41, a voice browser may be utilized to output voice XML pages to a caller and monitor responses from the caller.

According to one advantage of the present invention, a VID may indicate the device from which a caller is placing a call, providing a context for the interface and format in which call hold queue information may be published to the caller. For example, if a VID indicates that a caller is utilizing a personal digital assistant device with telephony capabilities, the call hold queue information may be transmitted to the device for output via the display interface of the personal digital assistant. Alternatively, a caller may indicate a preference for call hold queue information to be published to an alternate caller accessible interface, such as caller accessible interfaces 45a–45n.

According to another advantage of the present invention, a caller profile server 50, accessible via network 20, preferably stores multiple caller profiles, with a profile for each caller stored according to a single VID. Multiple call centers, such as call center 16, may access and update caller profiles according to VIDs at caller profile server 50. In particular, call centers may access caller profiles in order to more accurately estimate waiting times within a call hold queue according to the call hold profiles of callers waiting within the queue and callers interacting with representatives. Where multiple call centers update a caller profile according to VID for the wait times and hold queue usage, waiting times may be more accurately estimated at that call center and other call centers in the future.

In addition to information received as a VID, caller profiles accessed according to a VID may also indicate preferences of preferred interfaces and formats for publication. Such preferences may include an interface at telephony devices 8a–8n or caller accessible interfaces 45a–45n. Preferences may be further specified for an interface according to the position of a caller within a hold queue. For example, if a caller is more than twenty positions away in a hold queue, then the caller may prefer that call hold queue information be published to a caller accessible interface, such as a personal computing system. However, as the caller advances in the hold queue, the caller may prefer that call hold queue information be published to a telephony device via voice prompts.

Interfaces may include display, text messaging, video, audio, and other output devices. In addition, an interface may include an electronic mail or instant messaging server that is accessible to a caller according to a VID.

As illustrated, on hold system 42 accesses caller profile server 50 via network 20. Advantageously, by storing caller profiles in caller profile server 50 according to VID, only a single identifier is needed to access a caller profile and only a single location is provided for access to a caller profile. Further, advantageously, each call center may update call center activity for a particular caller according to a single identifier. In some cases, different portions of a caller profile may be stored in different server system locations, but each referenced for a single caller according to that caller's VID.

Figure 3:
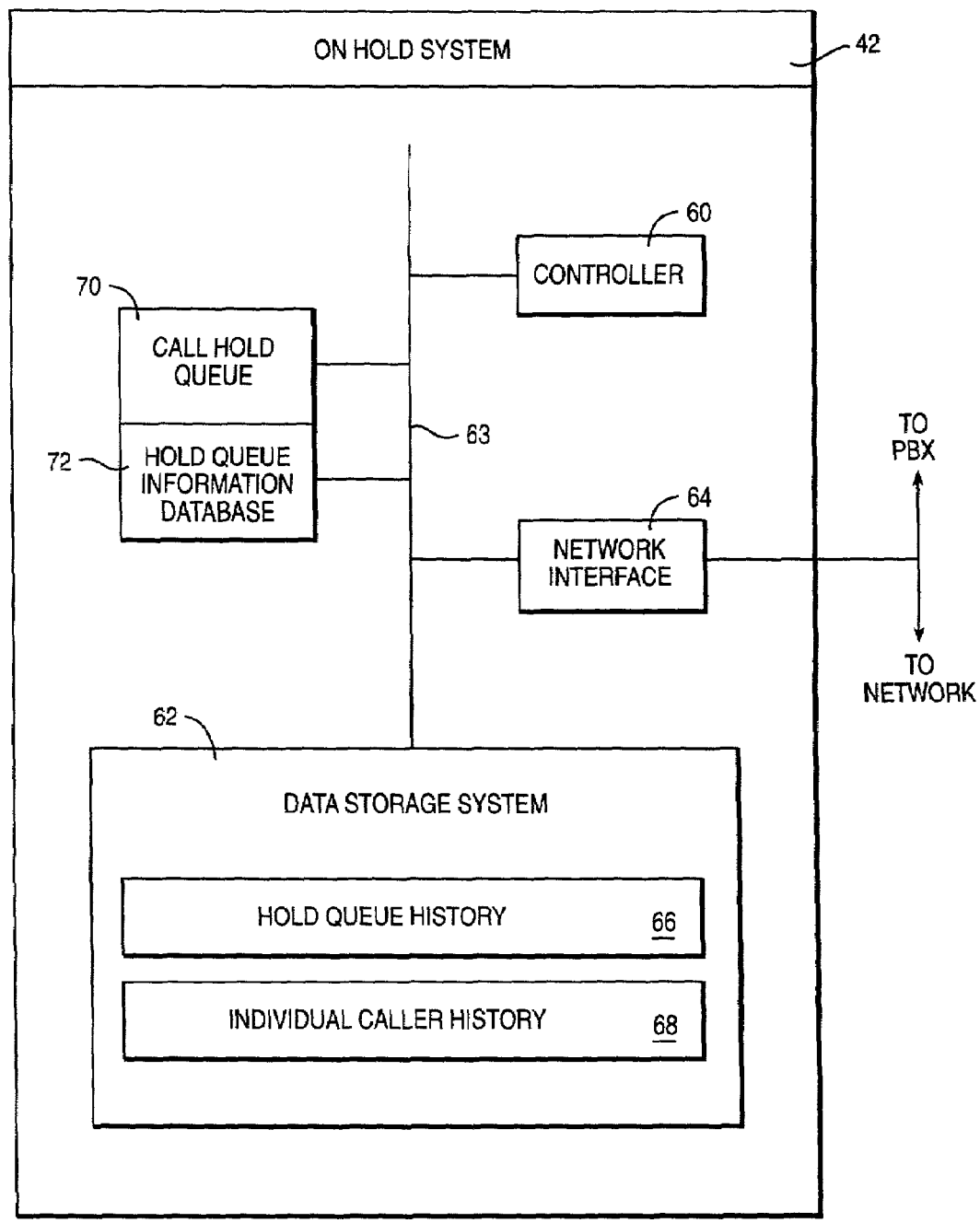
FIG. 3 illustrates a block diagram of an on hold system in accordance with the method, system, and program of the present invention.

Referring now to FIG. 3, is an illustrative block diagram of an on hold system in accordance with the method, system, and program of the present invention. As illustrated, on hold system 42 includes a controller 60, a call hold queue 70, hold queue information database 72, a network interface 64, and a data storage system 62 communicatively connected via a bus 63. Additional systems may be connected along bus 63 that are not depicted herein. In particular, controller 60 comprises conventional computer resources including, but are not limited to, at least one processor, memory, a data storage system, system software and application software, that function together to perform the functions described with reference to controller 60.

Network interface 64 preferably communicates with PBX 40, caller accessible systems and telephony devices via a telephone network or other networking system. In particular, network interface 64 receives transfers of calls from PBX 40 and then returns calls to PBX 40 when a call is the next in line within call hold queue 70.

Hold queue information database 72 is preferably coupled to call hold queue 70 to maintain characteristics of on hold system 42. In particular, hold queue information database 72 includes information about the current status of call hold queue 70 and the current status of calls at representatives. In particular, the status of call hold queue 72 may indicate services that in use by callers while on hold.

In addition, controller 60 preferably monitors past and current call queue activity in order to estimate wait times, which are added to hold queue information database 72. Data storage system 62 includes a hold queue history database 66 and an individual caller history database 68 from which controller 60 calculates historical averages for call hold queue 70 in general and historical averages for a particular caller or group of callers. Average wait times are then updated in hold queue information database 72.

According to an advantage of the present invention, a caller profile is requested for each caller VID from a caller profile server and/or from individual caller history 68. The caller profile is utilized to update hold queue information database 72 according to on hold caller VIDs. In particular, each caller profile preferably indicates the average time with representatives, where average time with representatives may be further specified according to a specific representative, a specific call center, and a specific subject of the call.

Utilizing all the information managed in hold queue information database 72, controller 60 may estimate a hold time, a total call time, and other times for each call in call hold queue 70. In addition, a caller may be provided with the information managed in hold queue information database 72 in a published format, such that the caller may visually determine estimated wait times.

While a call is on hold within call hold queue 70, the caller is preferably prompted to select from multiple options by IVRU 41. Particular to the present invention, options may include requesting a publication of the call hold queue information and updating the subject of the call in the call hold queue information. In addition, other options may be provided to a user including musical selections, news selections, third-party lines, competitions, and other call hold options.

If a caller requests a publication of the call hold queue information, then the caller is next prompted to indicate the method by which the caller would like to receive the publication. In particular, the method of receiving the publication may include both the format in which the publication is received and the interface at which the publication is received.

If the caller prefers to receive a voice, text, or graphical publication of the call hold queue information at a telephony device utilized to place the call, then the identity and capabilities of the device may be extracted from the VID in order to specify the interface and format of output. Controller 60 preferably specifies output of the call hold queue information for the particular VID, such that the caller receives a specified estimation of a wait time for that caller. In particular, a graphical output of the specified call hold queue information may include visual indicators of wait time elements, such as color coding of activities and highlighting of caller entries that are outside a boundary of what is considered an average call time.

If the caller prefers to receive a voice, text, or graphical publication of the call hold queue information at a caller accessible interface, then IVRU 41 may provide output of a network address for the caller to access from the caller accessible interface. To access the call hold queue information, the caller utilizes a caller accessible interface, such as a personal computer system with a network connection, to access a web or other network page at the address. The caller preferably authenticates an identity at the caller accessible interface, where the identity is transmitted as a VID for accessing the call hold queue information specified by controller 60 for the VID.

In particular, on hold system 42 may function as a server location for the network address. Alternatively, on hold system 42 may be coupled to an additional server system that serves as the location for the network address and manages web related functions.

Further, if the caller prefers to receive an e-mail or instant message of the call hold queue information that the caller may then access at a caller accessible system or other computing system with network connectivity, then the VID is utilized to transmit an instant message or e-mail. A caller may then receive the instant message or access e-mail via a device where the caller is currently logged on.

According to another advantage of the present invention, a caller may designate publication preferences that are stored in individual call history database 68 or with the caller profile in the universally accessible caller profile server. Publication preferences are preferably stored according to a VID and accessed when a VID is detected with an incoming call.

In particular, publication preferences may designate the types of information the caller prefers from hold queue information database 72. In addition, a caller may indicate a preference for the interface and format in which hold queue information should be published to the caller. Further, where the caller is receiving the information via a web page or other graphical format, the caller may designate graphical preferences for publication. Moreover, a caller may request anonymity within the queue in publication preferences.

According to another advantage of the present invention, each caller may indicate the anticipated subject matter of the call, where the anticipated subject matter for each call is stored in hold queue information database 72. In particular, the caller may select the subject matter of the call in order to determine which of multiple call queues a call should be positioned within. In addition, if necessary, a caller may further select to update the anticipated subject matter of the call while on hold. Updating a subject matter may adjust which call queue a call is held within. Moreover, a caller may indicate the subject of a call when authenticating the caller's identity, such that the VID includes the anticipated subject matter of the call.

With reference now to FIG. 4, is an illustrative hold queue information menu transcript in accordance with the method, system, and program of the present invention. As illustrated, a transcript 80 includes textual promptings and responses to selections. According to one embodiment of the present invention, transcript 80 is stored in a on hold system and utilized by an IVRU for interaction with a caller.

First, the caller is prompted to receive a publication of hold queue information by pressing or entering "1". If the caller selects to receive a publication, then the caller is prompted to select the output format and interface for publication. The information to be published to the caller may be output by voice, text, graphics, or video.

Second, the caller is prompted to log the subject matter of the call by pressing or entering "2". If the caller selects to log the subject matter of the call, then the caller is prompted to select from among multiple pre-defined subject matter. As an alternative to logging a subject matter, as previously described, a caller may indicate a subject matter of a call when authenticating an identity, such that the VID for the caller indicates the subject matter or other context for the call.

Referring now to FIG. 5, is a graphical representation of a hold queue information publication in accordance with the method, system, and program of the present invention. As illustrated, a display interface 82 displays a hold queue information publication 84, specified for a particular VID.

In the present example, the caller has specified a preference for the categories of "queue position", "call duration", "time with representative", "representative", "subject matter", "average time, representative, and subject" and "on hold activity" to be displayed. In alternate embodiments, other callers may specify alternate categories to be displayed within hold queue information publication 84. In addition, in alternate embodiments, other callers may specify alternate graphical formats for display of hold queue information publication 84.

Display interface 82 includes a selectable button 86 where, in response to selection of selectable button 86, a caller is prompted with types of subject matter to assign to a call.

According to one advantage of the present invention, a caller profile for VID of each call to a call center may be retrieved from a remote and/or local caller profile server. Caller profiles for each caller preferably include an average time that each caller spends with representatives across multiple call centers. In addition, an average time for the particular call center may be provided. The average times with a representative may further be specified according to the average time that a caller spends with a specific representative. Moreover, the average times with a representative may further be specified according to the current subject matter of a call.

According to another advantage of the present invention, a profile is stored for each representative that tracks the average time that each representative spends with each caller. The average time per representative may further be specified according to time of day, subject matter of the call, call volume and other criteria. For example, a representative may spend less time answering questions at the beginning of a shift than towards the end of a shift.

According to a further advantage of the present invention, a current on hold activity of each caller waiting in the hold queue may be provided. Advantageously, callers may select multiple activities while on hold including, but not limited to, accessing a freelance or other type of expert, participating in a competition or survey, and accessing a third party, such as a messaging system.

Further, averages may be provided for caller wait time estimates based on the on hold activity of each caller waiting in the hold queue. The on hold activity estimates may further be specified according to the subject matter of the call and other factors.

For example, a caller profile may indicate the percentage of times that a particular caller will stay with the freelance expert, rather than transfer to a representative, when the representative is available. In the example, the caller in queue position "1" stays with a freelance expert 25% of the time that a freelance expert is accessed.

In another example, a caller profile may indicate the number of positions that a caller typically jumps as a result of participating in a survey. In the present example, a caller typically jumps two positions when participating in a survey. In addition, the on hold activity may indicate the number of positions that a caller has already jumped as a result of participation in a survey, competition, previous hold times, or other activity that allows a caller to adjust in position with a call hold queue in addition to the natural progression of the caller through the call hold queue.

Utilizing the averages previously described, the on hold system preferably estimates a time remaining in the hold queue for each caller. In particular, by utilizing the average time with callers for each representative, the average time with representatives for each caller, and the on hold activity percentages for each caller, the on hold system may make a realistic estimate of wait time as illustrated at block 88. Advantageously, a caller is enabled to view the values of variable utilized to provide the estimate. Estimates may adjust as the values utilized to calculate the estimate adjust.

In addition to providing a single time remaining estimate, an estimate of the time to be taken by each caller waiting in the hold queue and each caller at a representative may be provided. In the present example, an average time per caller is calculated for the call center. Then, for each caller currently in the system, a multiplier is estimated for each caller's time in the call center. For example, if "x" represents the average time per caller, then, the caller currently speaking with representative "Joe Duck" is estimated to utilize 1.5 times the average time per caller. The estimated time is preferably calculated according to the average times for the representative, the caller's average times and other criteria. Estimates may adjust as the values utilized to calculate the estimate adjust.

According to another advantage of the present invention, the graphical output of each position within hold queue information publication 84 may be adjusted to reflect activity. For example, the hold queue positional entry for caller who is likely to remain with a freelance expert, rather than transfer to a representative, may be illustrated in a distinguishable color that indicates the type of activity. In another example, all entries for callers participating in competitions or surveys may be depicted in another distinguishable color. Other types of distinguishable colors and other graphical attributes may be adjusted for each caller entry in order to reflect activity.

In the present example, anonymity is provided for each caller in the hold queue information publication. However, in alternate embodiments, name of a caller or other identifier included in a VID may be published. In particular, each caller may request anonymity or an on hold system may select anonymity of callers in publication of hold queue characteristics.

Figure 6:
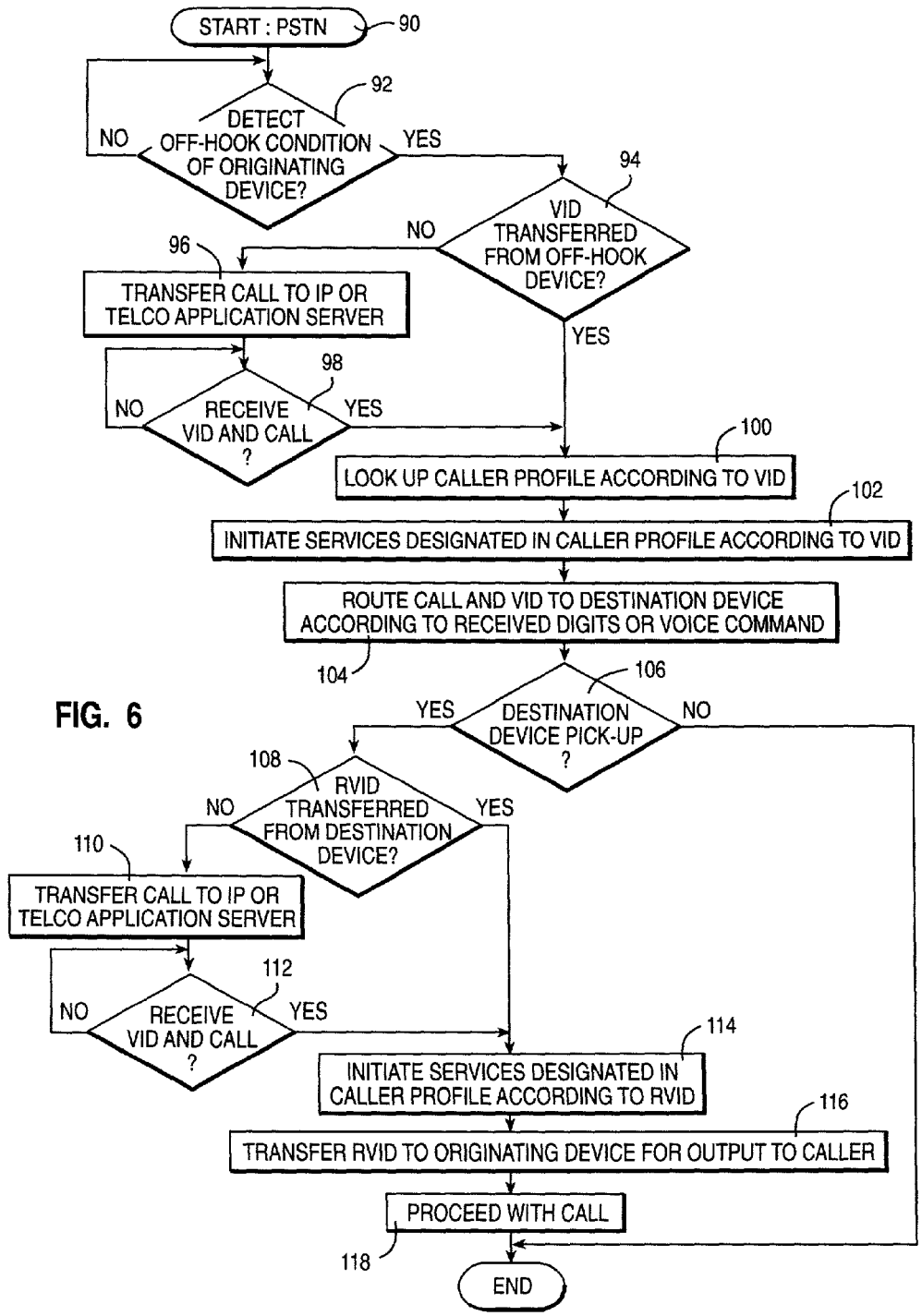
FIG. 6 illustrates a high level logic flowchart of a process and program for controlling a switching network in accordance with the method, system, and program of the present invention.

With reference now to FIG. 6, there is depicted a high level logic flowchart of a process and program for controlling a switching network in accordance with the method, system, and program of the present invention. As illustrated, the process starts at block 90 and thereafter proceeds to block 82.

Block 92 illustrates a determination as to whether an off-hook condition is detected in association with an originating telephony device. If an off-hook condition is not detected, then the process iterates at block 92. If an off-hook condition is detected, then the process passes to block 94.

Block 94 depicts a determination as to whether a VID is transferred from the off-hook device. The originating telephony device may authenticate an identity for a caller. However, the PSTN and other servers connected thereto may require additional authentication within a trusted network for access to certain types of services. If a VID is received and no additional authentication is required, then the process passes to block 100. If a VID is not received or if the PSTN requires additional authentication, then the process passes to block 96. Block 96 illustrates transferring the call to an intelligent peripheral or a telco application server for authentication. Block 98 depicts a determination as to whether the VID and the call are returned to the switching center. If not, then the process iterates at block 98. If the VID and the call are returned, then the process passes to block 100.

Block 100 depicts looking up the caller services profile according to VID. The caller services profile may be stored in a database within the PSTN, in an extended network to the PSTN or in a network external to the PSTN. Next, block 102 illustrates initiating services designated in the caller profile retrieved according to the VID. Thereafter, block 104 depicts routing the call and the VID to a destination device according to received digits or a voice command, and the process passes to block 106.

Block 106 illustrates a determination as to whether the destination device is detected with a pick-up (off-hook) condition. If the destination device does not pick-up, then the process ends. If the destination device does pick-up, then the process passes to block 108.

Block 108 depicts a determination as to whether an RVID is transferred from the destination device. If the RVID is transferred, then the process passes to block 114. If not, then the process passes to block 110. Block 110 illustrates transferring the call to an intelligent peripheral or telco application server. Next, block 112 depicts a determination as to whether an RVID and call are received back at the switching center. If not, then the process iterates at block 112. When the RVID and call are received, then the process passes to block 114. In the present invention, it is advantageous to require and RVID for the call center before a caller profile server will release a caller profile for a VID. In addition, an RVID may be provided to a caller for the representative that a caller is connected to by a call center.

Block 114 illustrates initiating services designation in a caller profile associated with the RVID. Next, block 116 depicts transferring the RVID to the originating device for output to the caller. Thereafter, block 118 illustrates proceeding with the call, where additional services are applied when applicable, and the process ends.

Figure 7:
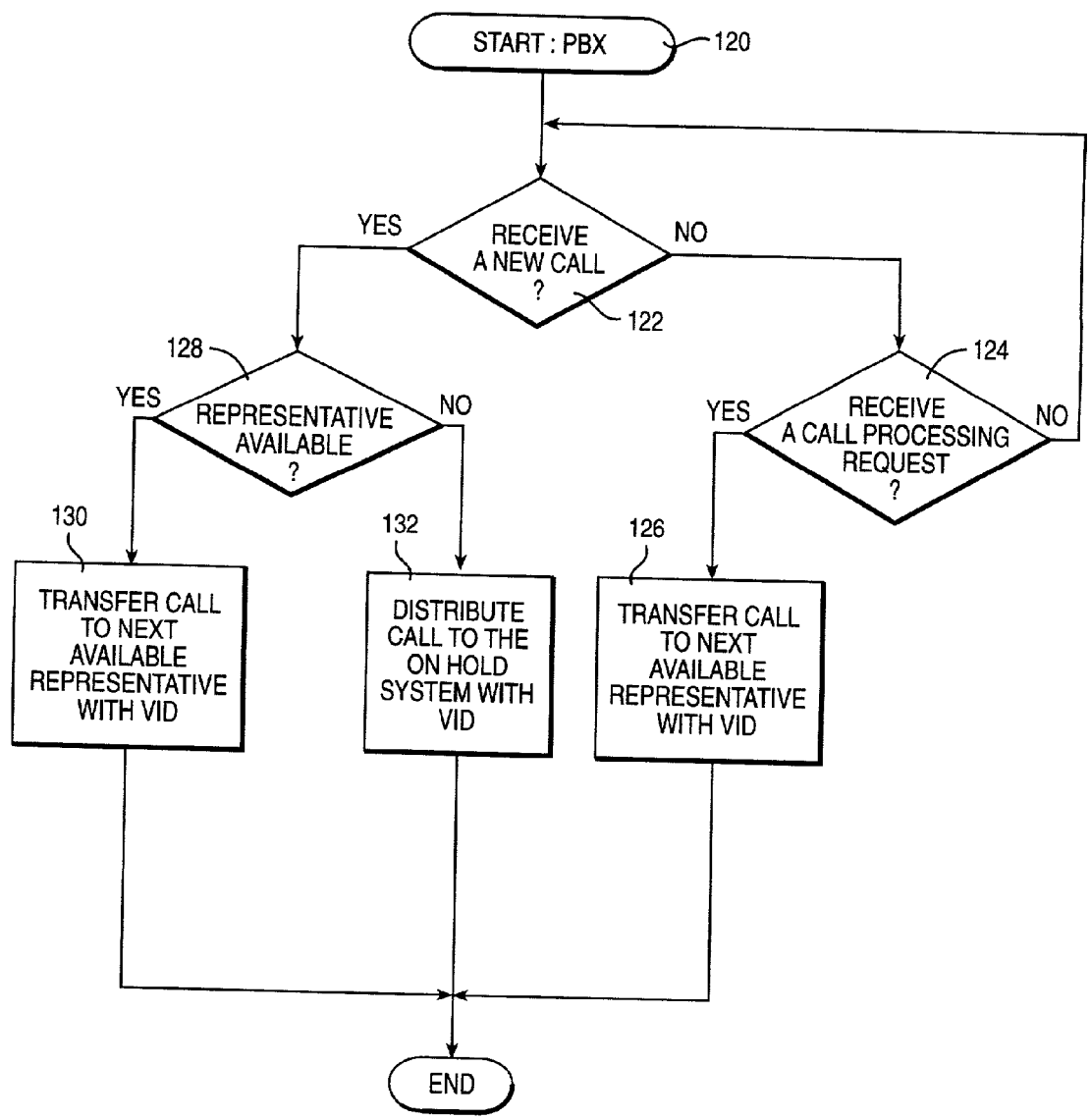
FIG. 7 depicts a high level logic flowchart of a process and program for controlling a PBX system within a call center in accordance with the method, system, and program of the present invention.

With reference now to FIG. 7, there is depicted a high level logic flowchart of a process and program for controlling a PBX system within a call center in accordance with the method, system, and program of the present invention. As illustrated, the process starts at block 120 and thereafter proceeds to block 122.

Block 122 depicts a determination as to whether a new call is received. If a new call is received, then the process passes to block 128. If a new call is not received, then the process passes to block 124. Block 124 illustrates a determination as to whether or not a call processing request is received. When a call is at the top of the call queue, the call is preferably transferred back to the PBX with a call processing request. If a call processing request is not received, then the process passes to block 122. If a call process request is received, then the call is transferred to the next available representative with a VID, as depicted at block 126, and the process ends.

Block 128 illustrates a determination as to whether or not a representative is available. If a representative is available, then the call is transferred to the next available representative with a VID, as illustrated at block 130, and the process ends. If a representative is not available, then the process passes to block 132. Block 132 illustrates distributing the call to the on hold system with the VID, and the process ends.

Referring now to FIG. 8, illustrates a high level logic flowchart of a process and program for controlling an on hold system in accordance with the method, system, and program of the present invention. As depicted, the process starts at block 140 and thereafter proceeds to block 142.

Block 142 illustrates a determination as to the event that occurred when an event occurs. If a new call is received, then the process passes to block 144. If a VID is received from a caller accessible system, then the process passes to block 166.

Block 144 depicts placing the call in the call queue. In placing the call in the call queue, a record of the call is placed in the call hold queue information database in association with a VID and any information incorporated in the VID is stored in the hold queue information database. Next, block 146 illustrates transmitting a request for a caller profile according to the VID of the call. A request for a caller profile may include accessing a locally stored caller profile and/or a remotely stored caller profile. Thereafter, block 148 depicts an iteration at block 148 until a caller profile is received, and the process passes to block 150.

Block 150 illustrates updating the hold queue information database with the caller profile for the VID. Next, block 152 depicts playing the queue information menu to the caller. Thereafter, block 154 illustrates a determination as to whether a caller has selected to receive a publication of the hold queue information. If a caller has not selected to receive a publication of the hold queue information, then a activity menu transcript is played to the caller, as illustrated at block 156, and the process ends. If a caller has selected to receive a publication of the hold queue information, then the process passes to block 158.

Block 158 depicts prompting the caller to select a preferred format and interface for the publication. Next, block 160 illustrates specifying the hold queue information publication for the caller. In specifying hold queue information publication, publication preferences for a caller, retrieved with the caller profile, may be implemented. In addition, in specifying hold queue information publication, a caller specific wait time is preferably estimated. In particular, the on hold system controller is preferably constantly monitoring caller activity within the on hold system and with representatives, such that the controller is enabled to estimate wait times.

Block 162 depicts publishing the hold queue information to the selected interface in the selected format. Next, block 164 illustrates updating the hold queue information publication according to adjustments in the hold queue information database, and the process ends.

Block 166 illustrates specifying hold queue information publication according to the VID. Next, block 168 depicts transferring the hold queue information to the requesting caller accessible system, and the process ends. Preferably, the hold queue information continues to be updated at the caller accessible system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for estimating wait times within a hold queue comprising:
   receiving a plurality of calls at a call center, wherein each caller associated with a call from among said plurality of calls is identified by an authenticated caller identifier;
   retrieving, for each caller according to said authenticated caller identifier, a caller profile from among a plurality of caller profiles, wherein each of said plurality of caller profiles indicates a previous call center usage history for each said caller;
   estimating a plurality of call times individually for each of said plurality of calls within a call center based on said previous call center usage history for each said caller;
   positioning a particular call received from a particular caller at said call center within a hold queue; and
   estimating a wait time in said hold queue for said particular call according to said plurality of call times individually estimated for said plurality of calls within said call center; and
   adjusting a selection of an output interface to which said wait time is output based on an amount of time remaining in said wait times wherein at a first amount of time remaining in said wait time said wait time is output to a second output interface.

2. The method for estimating wait times within a hold queue according to claim 1, wherein estimating a plurality of call times further comprises:
   estimating said plurality of call times according to at least one from among an average time per representative, an average time per caller, and an activity participated in by a selection of said plurality of callers waiting in said hold queue.

3. The method for estimating wait times within a hold queue according to claim 2, wherein said average time per representative is further specified according to at least one from among a time of day and a subject.

4. The method for estimating wait times within a hold queue according to claim 2, wherein said average time per caller is further specified according to at least one from among an average time with representatives across a plurality of call centers, an average time with a particular representative, an average time for a subject, and an average time of a total call within said call center.

5. The method for estimating wait times within a hold queue according to claim 2, wherein said activity participated&l in by a selection of said plurality of callers comprises at least one from among a third party call, a competition, a survey, an expert session, and an entertainment service.

6. The method for estimating wait times within a hold queue according to claim 1, further comprising:
   publishing said wait time to an interface selected by said caller.

7. The method for estimating wait times within a hold queue according to claim 6, wherein publishing said wait time further comprises:
   publishing a plurality of criteria utilized to estimated said plurality of call times.

8. The method for estimating wait times within a hold queue according to claim 1, wherein a selection of said plurality of calls are currently waiting in said hold queue.

9. The method for estimating wait times within a hold queue according to claim 1, wherein a selection of said plurality of calls are currently being assisted by a plurality of representatives within said call center.

10. The method for estimating wait times within a hold queue according to claim 1, further comprising:
    updating a caller profile server according to a session for said particular call according to said authenticated identifier for said particular caller, wherein said caller profile server maintains a plurality of caller profiles stored according to a plurality of authenticated identifiers for compiling information about sessions at at least one call center.

11. The method according to claim 1 for estimating wait times within a hold queue wherein each said authenticated caller identifier is voice authenticated.

12. A system for estimating wait times within a hold queue, comprising:
    a call center for receiving a plurality of calls;
    means for receiving a plurality of calls at a call center, wherein each caller associated with a call from among said plurality of calls is identified by an authenticated caller identifier;
    means for retrieving, for each caller according to said authenticated caller identifier, a caller profile from among a plurality of caller profiles, wherein each of said plurality of caller profiles indicates a previous call center usage history for each said caller;

means for estimating a plurality of call times individually for each of said plurality of calls within a call center based on said previous call center usage history for each said caller;

means for positioning a particular call received from a particular caller at said call center within a hold queue; and means for estimating a wait time in said hold queue for said particular call according to said plurality of call times individually estimated for said plurality of calls within said call center; and means for adjusting a selection of an output interface to which said wait time is output based on an amount of time remaining in said wait time, wherein at a first amount of time remaining in said wait time said wait time is output to a first output interface and at a second amount of time remaining in said wait time said wait time is output to a second output interface.

13. The system for estimating wait times within a hold queue according to claim 12, wherein said means for estimating a plurality of call times further comprises:

means for estimating said plurality of call times according to at least one from among an average time per representative, an average time per caller, and an activity participated in by a selection of said plurality of callers waiting in said hold queue.

14. The system for estimating wait times within a hold queue according to claim 13, wherein said average time per representative is further specified according to at least one from among a time of day and a subject.

15. The system for estimating wait times within a hold queue according to claim 13, wherein said average time per caller is further specified according to at least one from among an average time with representatives across a plurality of call centers, an average time with a particular representative, an average time for a subject, and an average time of a total call within said call center.

16. The system for estimating wait times within a hold queue according to claim 13, wherein said activity participated in by a selection of said plurality of callers comprises at least one from among a third party call, a competition, a survey, an expert session, and an entertainment service.

17. The system for estimating wait times within a hold queue according to claim 12, further comprising:

means for publishing said wait time to an interface selected by said caller.

18. The system for estimating wait times within a hold queue according to claim 17, wherein said means for publishing said wait time further comprises:

means for publishing a plurality of criteria utilized to estimated said plurality of call times.

19. The system for estimating wait times within a hold queue according to claim 12, wherein a selection of said plurality of calls are currently waiting in said hold queue.

20. The system for estimating wait times within a hold queue according to claim 12, wherein a selection of said plurality of calls are currently being assisted by a plurality of representatives within said call center.

21. The system for estimating wait times within a hold queue according to claim 12, further comprising:

means for updating at least one caller profile server according to a session for said particular call according to said authenticated identifier for said particular caller, wherein said at least one caller profile server maintains a plurality of caller profiles stored according to a plurality of authenticated identifiers for compiling information about sessions at at least one call center.

22. The system according to claim 12 for estimating wait times within a hold queue wherein each said authenticated caller identifier is voice authenticated.

23. A computer program product for estimating wait times within a hold queue, said computer program product comprising:

a recording medium;

means, recorded on said recording medium, for receiving a plurality of calls at a call center, wherein each caller associated with a call from among said plurality of calls is identified by an authenticated caller identifier;

means, recorded on said recording medium, for retrieving, for each caller according to said authenticated caller identifier, a caller profile from among a plurality of caller profiles, wherein each of said plurality of caller profiles indicates a previous call center usage history for each said caller;

means, recorded on said recording medium, for estimating a plurality of call times individually for each of said plurality of calls based on said previous call center usage history for each said caller;

means, recorded on said recording medium, for positioning a particular call received from a particular caller at said call center within a hold queue;

means recorded on said recording medium, for estimating a wait time in said hold queue for said particular call according to said plurality of call times individually estimated for said plurality of calls within said call center; and means, recorded on said recording medium, for adjusting a selection of an output interface to which said wait time is output based on an amount of time remaining in said wait time, wherein at a first amount of time remaining in said wait time said wait time is output to a first output interface and at a second amount of time remaining in said wait time said wait time is output to a second output interface.

24. The computer program product for estimating wait times within a hold queue according to claim 23, wherein said means for estimating a plurality of call times further comprise:

means, recorded on said recording medium, for estimating said plurality of call times according to at least one from among an average time per representative, an average time per caller, and an activity participated in by a selection of said plurality of callers waiting in said hold queue.

25. The computer program product for estimating wait times within a hold queue according to claim 23, further comprising:

means, recorded on said recording medium, for controlling output of said wait time to an interface selected by said caller.

26. The computer program product for estimating wait times within a hold queue according to claim 25, wherein said means for publishing said wait time further comprises:

means, recorded on said recording medium, for controlling output of a plurality of criteria utilized to estimated said plurality of call times.

27. The computer program product for estimating wait times within a hold queue according to claim 23, further comprising:

means, recorded on said recording medium, for updating at least one caller profile server according to a session for said particular call according to said authenticated identifier for said particular caller, wherein said at least one caller profile server maintains a plurality of caller profiles stored according to a plurality of authenticated identifiers for compiling information about sessions at at least one call center.

28. The computer program product according to claim 23 for estimating wait times within a hold queue wherein each said authenticated caller identifier is voice authenticated.

29. A method for monitoring caller on hold characteristics, comprising:

receiving, at a caller profile server, monitored on hold characteristics according to an authenticated caller identifier of a caller from at least one call center at which said caller has waited in a hold queue from among a plurality of call centers communicatively connected to said caller profile server;

computing, at said caller profile server, on hold statistics for said caller across at least one from among said plurality of call centers from said monitored on hold characteristics in said caller profile maintained in association with said authenticated caller identifier;

responsive to receiving a request for said caller profile according to said authenticated caller identifier at said caller profile server, distributing said computed on hold statistics for said caller, such that each of said plurality of call centers is independently enabled to estimate wait times within a hold queue comprising said caller based on said on hold statistics.

30. The method according to claim 29 for monitoring on hold characteristics, wherein said authenticated caller identifier comprises an identifier for a device which compares a current voice sample provided by said caller with a previously stored voice sample for said caller to authenticate an identity of said caller.

31. The method according to claim 29 for monitoring on hold characteristics, wherein said on hold statistics specify on hold activity statistics of a caller accumulated from participation in on hold activities comprising at least one from among idleness, participation in surveys, participation in competitions, listening to music, and accessing a third party service.

32. The method according to claim 29 for monitoring on hold characteristics, further comprising:

receiving said request for said caller profile according to said authenticated caller identifier at said caller profile server via a media gateway, wherein said caller profile server is accessible within an internet based network that interfaces with said plurality of call centers which are accessible within a telephony network through said media gateway, wherein said media gateway supports a plurality of protocols for communication between said internet based network and said telephony network.

33. A system for monitoring caller on hold characteristics, comprising:

a caller profile server communicatively connected to a plurality of call centers;

said caller profile server further comprising:

means for receiving monitored on hold characteristics according to an authenticated caller identifier of a caller from at least one call center at which said caller has waited in a hold queue from among said plurality of call centers;

means for computing on hold statistics for said caller across at least one from among said plurality of call centers from said monitored on hold characteristics in said caller profile maintained in association with said authenticated caller identifier; and means, responsive to receiving a request for said authenticated caller profile according to said caller identifier, for distributing said computed on hold statistics for said caller.

34. The system according to claim 33 for monitoring on hold characteristics, wherein said authenticated caller identifier comprises an identifier for a device through which compares a current voice sample provided by said caller with a previously stored voice sample for said caller to authenticate an identity of said caller.

35. The system according to claim 33 for monitoring on hold characteristics, wherein said on hold statistics specify on hold activity statistics of a caller accumulated from participation in on hold activities comprising at least one from among idleness, participation in surveys, participation in competitions, listening to music, and accessing a third party service.

36. The system according to claim 33 for monitoring on hold characteristics further comprising:

a media gateway through which said caller profile server is communicatively connected to said plurality of call centers, wherein said caller profile server is accessible within an internet based network that interfaces with said plurality of call centers which are accessible within a telephony network through said media gateway, wherein said media gateway supports a plurality of protocols for communication between said internet based network and said telephony network.

37. A computer program product for monitoring caller on hold characteristics, said computer program product comprising:

a recording medium;

means, recorded on said recording medium, for enabling receipt of monitored on hold characteristics according to an authenticated caller identifier of a caller from at least one call center at which said caller has waited in a hold queue;

means, recorded on said recording medium, for computing on hold statistics for said caller across said at least one call center from said monitored on hold characteristics in said caller profile maintained in association with said authenticated caller identifier; and means, recorded on said recording medium, for distributing said computed on hold statistics for said caller.

38. The computer program product according to claim 37 for monitoring on hold characteristics, further comprising:

means, recorded on said recording medium, for enabling receipt of monitored on hold characteristics according to an authenticated caller identifier of a caller from at least one call center at which said caller has waited in a hold queue, wherein said authenticated caller identifier comprises an identifier for a device which compares a current voice sample provided by said caller with a previously stored voice sample for said caller to authenticate an identity of said caller.

39. The computer program product according to claim 37 for monitoring on hold characteristics, wherein said means, recorded on said recording medium, for computing on hold statistics for said caller across said at least one call center from said monitored on hold characteristics in said caller profile maintained in association with said authenticated caller identifier, further comprises:

means, recorded on said recording medium, for computing said on hold statistics which specify on hold activity statistics of a caller accumulated from participation in on hold activities comprising at least one from among idleness, participation in surveys, participation in competitions, listening to music, and accessing a third party service.

40. The computer program product according to claim 37 for monitoring on hold characteristics, further comprising:
means, recording on said recording medium, for enabling receipt of said request for said caller profile according to said authenticated caller identifier at said caller profile server via a media gateway, wherein said caller profile server is accessible within an internet based network that interfaces with said plurality of call centers which are accessible within a telephony network through said media gateway, wherein said media gateway supports a plurality of protocols for communication between said internet based network and said telephony network.

* * * * *